(12) United States Patent
Dean et al.

(10) Patent No.: US 10,386,628 B2
(45) Date of Patent: Aug. 20, 2019

(54) DOSING AND SEALING OF FLUID-BASED ELECTRO-OPTICAL DEVICES AND DISPLAYS

(71) Applicant: University Of Cincinnati, Cincinnati, OH (US)

(72) Inventors: Kenneth A. Dean, Phoenix, AZ (US); Jason Charles Heikenfeld, Cincinnati, OH (US); Kaichang Zhou, Cincinnati, OH (US); Hari Mukunda Atkuri, Edina, MN (US); Wyatt Austin Black Rodgers, Santa Barbara, CA (US)

(73) Assignee: University Of Cincinnati, Cincinnati, OH (US)

( * ) Notice: Subject to any disclaimer, the term of this patent is extended or adjusted under 35 U.S.C. 154(b) by 180 days.

(21) Appl. No.: 15/444,894

(22) Filed: Feb. 28, 2017

(65) Prior Publication Data
US 2017/0199373 A1    Jul. 13, 2017

Related U.S. Application Data

(62) Division of application No. 14/676,927, filed on Apr. 2, 2015, now Pat. No. 9,625,705.

(60) Provisional application No. 61/979,207, filed on Apr. 14, 2014.

(51) Int. Cl.
   *G02B 26/00*    (2006.01)

(52) U.S. Cl.
   CPC .................. *G02B 26/005* (2013.01)

(58) Field of Classification Search
   CPC ........................ G02B 26/004; G02B 26/005
   See application file for complete search history.

(56) References Cited

U.S. PATENT DOCUMENTS

| 8,213,072 B1 * | 7/2012 | Ku ..................... G02B 26/005 257/192 |
| 8,696,847 B2 | 4/2014 | Schram et al. |
| 2013/0048197 A1 * | 2/2013 | Schram ................ G02B 26/004 156/146 |
| 2014/0226200 A1 | 8/2014 | Nomura |

FOREIGN PATENT DOCUMENTS

| WO | 2008125644 A1 | 10/2008 |
| WO | 2009065909 A1 | 5/2009 |

* cited by examiner

*Primary Examiner* — Jeffry H Aftergut
(74) *Attorney, Agent, or Firm* — Wood Herron & Evans LLP

(57) ABSTRACT

A method for manufacturing an electrofluidic device comprising the steps of providing a first plate with features for holding a first fluid, filling a first fluid into features on a first plate; providing a second plate and sealing a second plate onto the first plate forming stacked plates with at least one cavity between the plates, and leaving at least one fill port for a second fluid. Thereafter, the stacked plates are cooled to increase the viscosity of the first fluid so that the first fluid maintains a fixed position as a second fluid is filled into the cavity. Methods are disclosed.

7 Claims, 10 Drawing Sheets

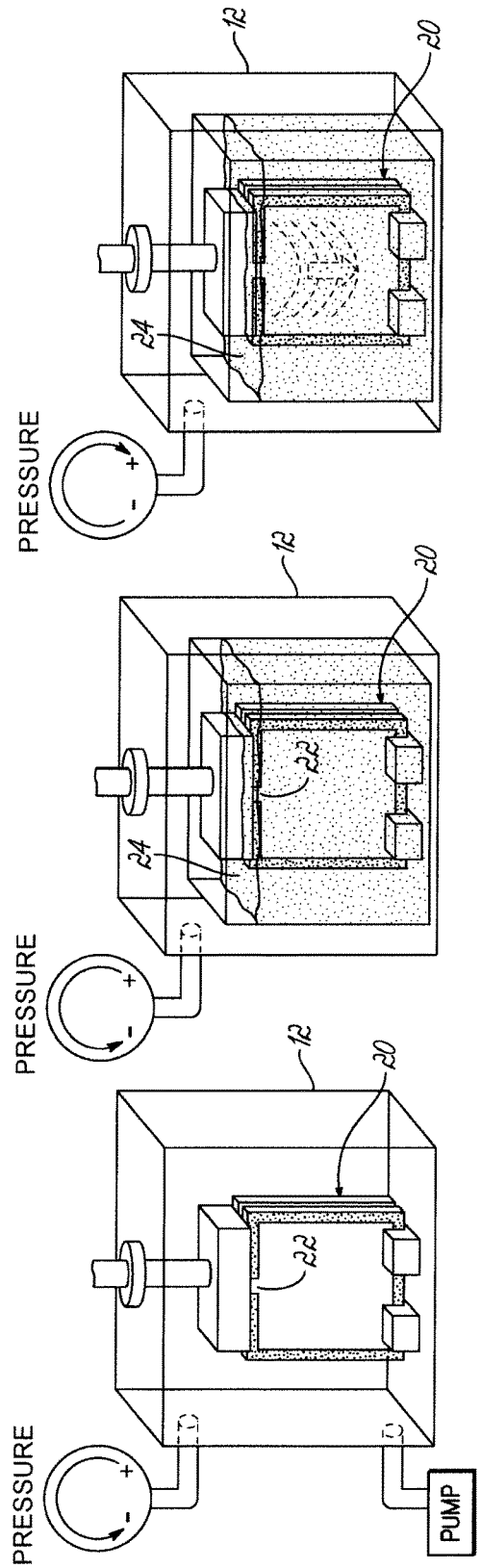

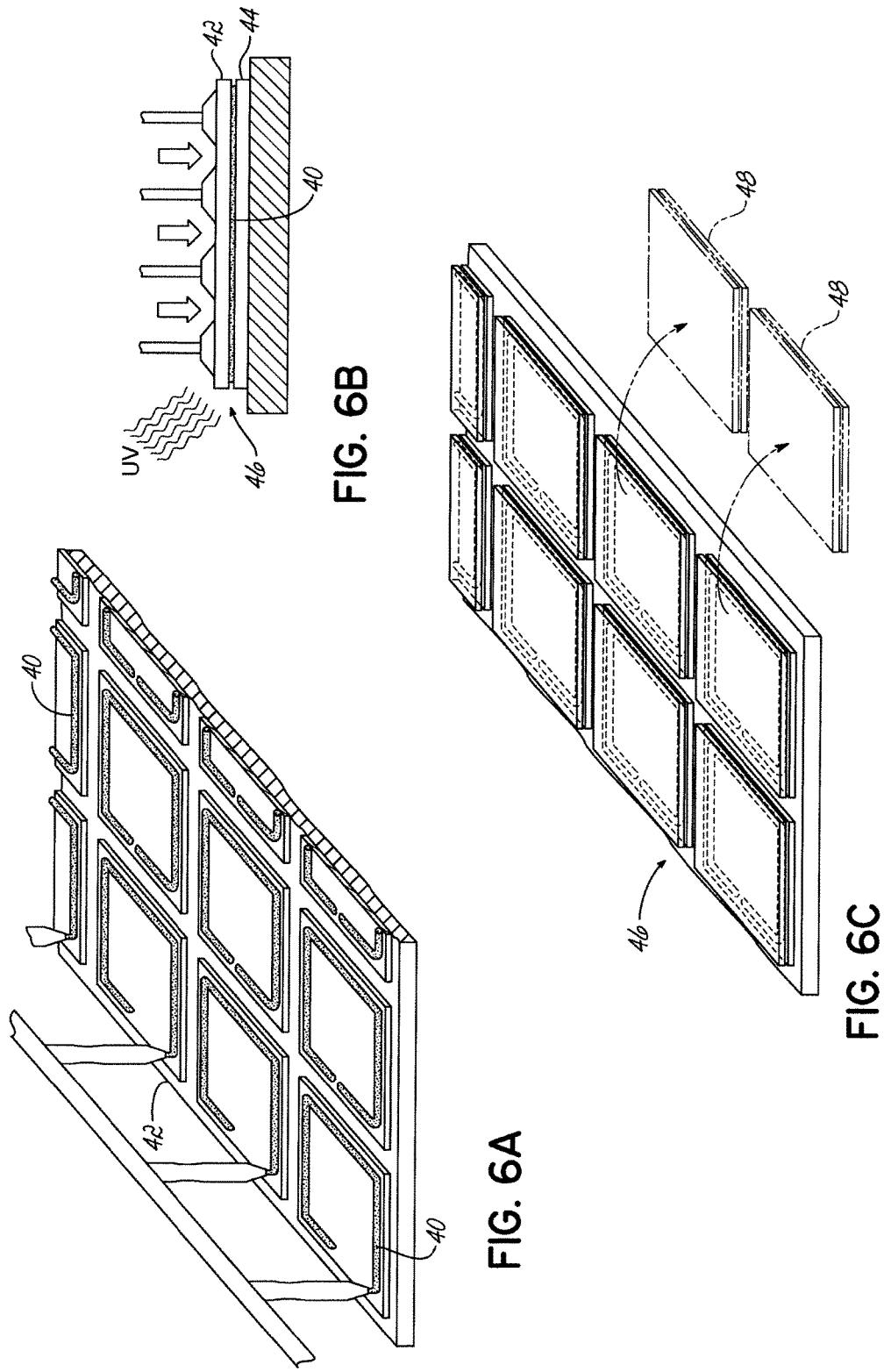

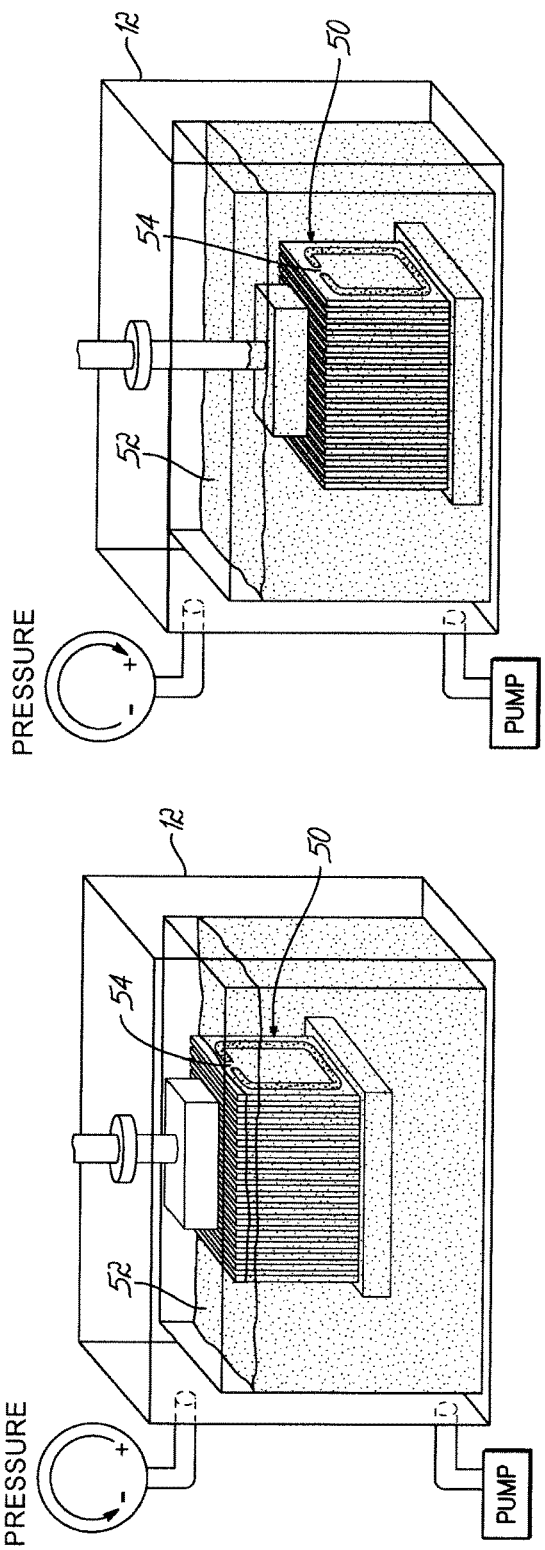
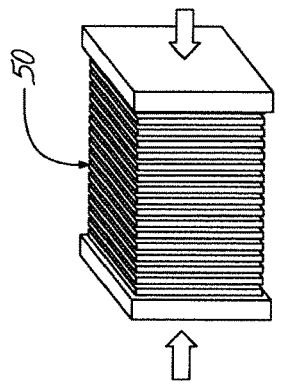
FIG. 7B
FIG. 7C
FIG. 7A

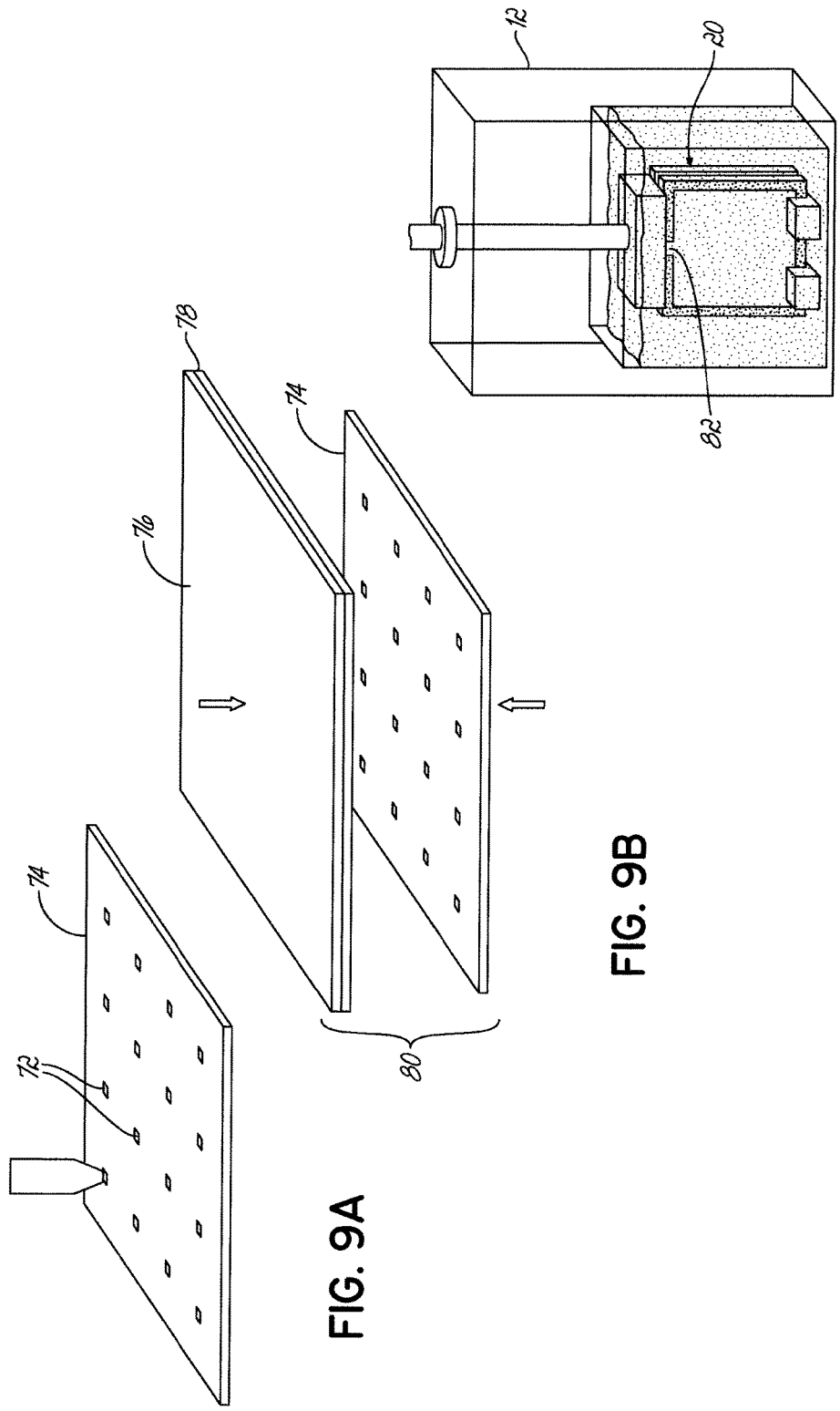

DOSING AND SEALING OF FLUID-BASED ELECTRO-OPTICAL DEVICES AND DISPLAYS

RELATED APPLICATION

The present application is a divisional application of U.S. Ser. No. 14/676,927, filed Apr. 2, 2015, which claims priority to U.S. Ser. No. 61/979,207 filed Apr. 14, 2014, the disclosures of which are hereby incorporated herein by reference in their entirety.

GOVERNMENT RIGHTS

This invention may have been made with government support under contracts 1058302 and 1 127463 awarded by the National Science Foundation. The government may have certain rights in the invention.

BACKGROUND OF THE INVENTION

Reflective displays are commercially important in product areas that include electronic readers (e-Readers) and electronic shelf labels. However, current reflective displays lack the performance of color printing on paper. Electrofluidic displays (EFDs), which were introduced in 2009, can provide vivid color, high brightness, and fast switching in a reflective display. Due to its unbeatable color performance, electrofluidic displays provide a solution for future e-paper technology. But due to its specific pixel structure and two different fluids, electrofluidic displays need a novel dosing and sealing technology.

Liquid crystal displays (LCDs) incorporate assemblies that are filled with only a single fluid—a liquid crystal fluid. Traditionally, the liquid crystal fluid has been filled into a LCD by first creating a cavity assembly between two plates, where the perimeter of the plates is sealed with the exception of providing a fill port. The structure is then subjected to vacuum to remove gases from the cavity assembly and thereafter dipped in a liquid crystal pool to allow liquid crystal to occupy the cavities between the plates. In addition, the plates may be subjected to a pressurized environment to drive liquid crystal into the cavities.

With extreme demand for the large LCD panels, this industry started using vacuum based 'drop' fill processes. In a drop fill liquid crystal process, drops of liquid crystal are placed upon a first plate (bottom plate) in vacuum at a precisely measured volume, and then a second plate (top plate) is positioned and bonded to the first plate to sandwich the cavity assembly therebetween, all in vacuum.

LCDs may be fabricated using liquid filling, but LCDs do not utilize two immiscible fluids and fail to address any of the problems associated with moving a first fluid (polar or nonpolar) over a second fluid (opposite of the first fluid) without displacing it. LCDs purposely avoid low temperature because the liquid crystal becomes too viscous to fill (fill time increased exponentially with decreasing temperature). Accordingly, these LCD processes cannot be adapted for EFDs.

In contrast to LCDs, EFDs and electrowetting displays (EWDs) require at least two immiscible fluids. During device fabrication, these two fluids, one being polar, and one being non-polar, must be loaded into a display module and then the display module is sealed. The surface energy of the materials, combined with the surface energy of the coatings in the display structure, the properties of the sealant, and the need to omit air bubbles from the display pose a significant technical challenge.

For EWDs, multiple dosing technologies have been reported. Researchers from University of Cincinnati reported self-assembled oil dosing technique utilizing the low surface tension of a colored nonpolar fluid. For this oil dosing process, the device is submerged into a polar fluid, and then a colored nonpolar fluid is injected by needles and then filled into pixels resulting from surface tension. Likewise, an ink-jet printing technique has been demonstrated to inject a colored nonpolar fluid into pixels on one plate, followed by covering the nonpolar fluid with a transparent polar fluid and capping the assembly with a top plate. Accordingly, EWD dosing processes always result in the colored nonpolar fluid filling a microwell. But, for EFDs, just the opposite is the case—a polar fluid must fill the microwell. Moreover, LCDs and EWDs do not involve filling cavities having a dimension in the range of tens of micrometers with individual fluids bodies, and consequently do not encounter air entrapment in small cavities, cleaving the fluid body to keep the ink in the cavities, or enhanced evaporation of the fluid due to its small radius of curvature.

Consequently, there is a need in the art for dosing techniques applicable to EFDs that provides for a reasonable cost display or shutter. More specifically, there is a need for dosing and sealing technologies that provide a reasonable cost manufacturing method for fabricating displays with two liquids inside, wherein one liquid is specifically placed into features, and no air is trapped in the device.

The invention will be further appreciated in light of the following detailed description and drawings, in which:

BRIEF DESCRIPTION OF THE DRAWINGS

FIGS. 3A-3C depict a sequential process for filling fluid cavities within electrofluidic devices with oil.

FIGS. 6A-6C depict an exemplary sequence in accordance with the instant disclosure.

FIGS. 7A-7C depict an exemplary sequence in accordance with the instant disclosure.

FIGS. 9A-9C depict an exemplary sequence in accordance with the instant disclosure.

DETAILED DESCRIPTION OF THE INVENTION

Although the present disclosure will be described in connection with certain embodiments, the description of one or more embodiments is not intended to cover all alternatives, modifications, and equivalent arrangements as may be included within the spirit of the present disclosure. In particular, those of ordinary skill in the art will recognize that the components of the various electrofluidic devices described herein may be arranged in multiple different ways.

Several novel methods are disclosed for successfully incorporating multiple fluids into electrofluidic devices while meeting device compatibility and performance requirements. Electrofluidic devices and displays operate by moving the relative position of a polar fluid and a non-polar fluid. The polar fluid is typically a mixture that contains a majority of a polar solvent, non-limiting examples of which include water, ethylene glycol, propylene glycol, gamma butyrolactone, and propylene carbonate. The non-polar fluid is typically a hydrocarbon or silicone-based oil. In a typical electrofluidic device, a colorant is added to the polar phase, such as a pigment or a dye. Colorants may also be added to the oil. Electrowetting displays typically dose the non-polar fluid onto the plate with fluid-holding features first, and polar phase second. Electrofluidic displays typically dose the polar fluid onto the plate with fluid-holding features first, and the non-polar phase second.

Electrofluidic and electrowetting devices are fabricated from a starting substrate, or first plate. Surface features and electronic film layers are incorporated on the first plate. The plate itself can be either rigid (i.e. a sheet of glass), or flexible (i.e. a sheet of plastic), or a sheet of flexible material bonded to a sheet of rigid material for support. The surface features, for example, can be an array of pixel structures comprising a central well or hole in a surface to store a first fluid, surrounded by a wall structure to contain this fluid during electrical actuation, as described in U.S. Pat. No. 8,111,465. Likewise, a top plate, forming a cavity for fluids, can also be a rigid sheet, a flexible sheet, or a combination of the two.

Figure 1A:
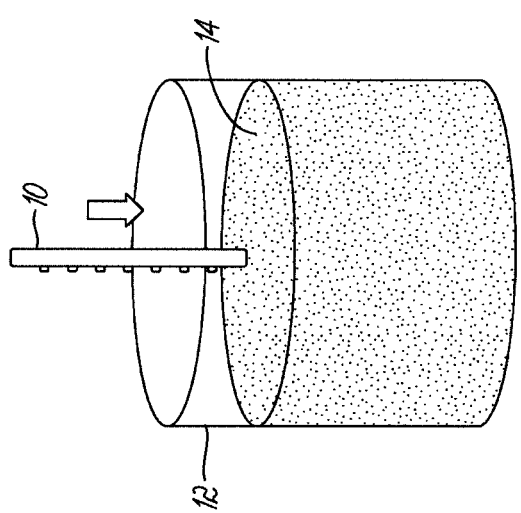
FIGS. 1A-1C depict a sequential process for ink filling of electrofluidic devices.
Figure 1B:
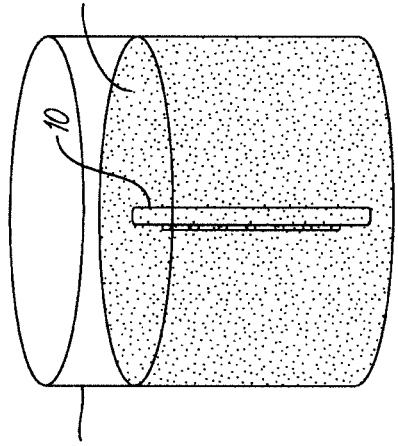
Figure 1C:
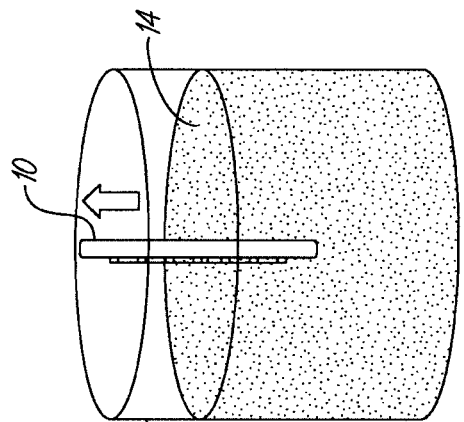

In example 1, the problem of dosing the two fluids while eliminating air bubbles is solved by following a first exemplary process. In step 1, as shown in FIG. 1A, a first plate 10 with surface features is positioned in a vacuum chamber 12 and vacuum is pulled to remove gases pulling a vacuum to remove air from the cavities. Referring to FIGS. 1A and 1B, the vacuum chamber 12 may include an ink supply 14 (i.e., an ink bath) in order to immerse the substrate 10 in the ink supply 14 after vacuum has been pulled for a predetermined period of time. After the substrate 10 is immersed in the ink supply 14, and while the substrate 10 remains immersed in the ink supply 14, the pressure is increased to push the ink into the wells. An example pressure increase is obtained by venting vacuum chamber 12 is vented to allow atmospheric conditions. But pressures above 50 torr will provide this benefit for certain conditions. After the vacuum chamber 12 is vented, as shown in FIG. 1C, the substrate 10 is removed from the ink supply 14 and the ink is removed from the surface of the substrate 10. More specifically, the removal of ink cleaves the ink on the surface and it remains in the cavities. It should be noted that the ink supply 14 within the vacuum chamber 12, in addition to the substrate 10 with the ink after cleaving, is chilled to reduce its evaporation rate of the ink.

Figure 2A:
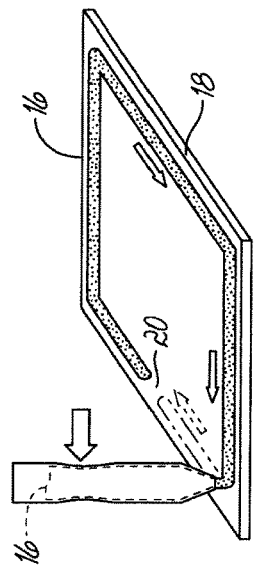
FIGS. 2A-2C depict a sequential process for forming fluid cavities within electrofluidic devices.
Figure 2B:
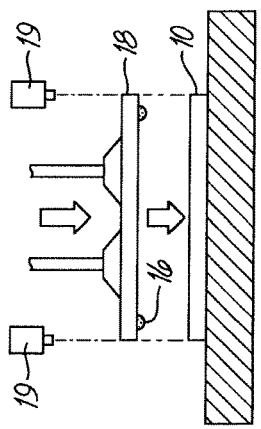
Figure 2C:
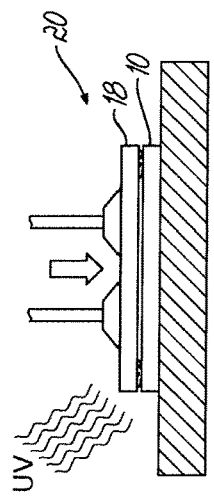

Referring to FIG. 2A, in step 2, an adhesive 16 (e.g., a UV-curable adhesive) is applied to a top plate 18. As shown in FIG. 2B, the top plate with adhesive 16 is aligned (with the aid of cameras 19) and contacts the substrate plate 10. Pressure is then applied, as shown in FIG. 2C, to the plate stack 20 while the adhesive 16 is UV-cured to create cavities between the top plate 18 and substrate 10 that will be filled with a second fluid (oil) in a following step. It should be noted that the adhesive pattern leaves at least one open port 22 for each display that allows filling of the second fluid.

Referencing FIG. 3A, the plate stack 20, which forms a single module, is placed into a vacuum chamber 12 and the pressure is reduced to remove gases from the cavities. The plate stack 20 may be pre-chilled prior to be placed into vacuum to reduce evaporation of the ink solvent. As shown in FIG. 3B, the plate stack 20 is thereafter immersed into a volume of oil (i.e., and oil bath) under vacuum while the temperature of the plate stack 20 is at or near the freezing point of the ink (first fluid). In one embodiment, the oil is chilled to −65° C. The part is immersed to a level below the fill port 22. Once the ink has become more chilled, the pressure can be reduced still further. An exemplary value of pressure is less than 10 torr, and preferably less than 1 torr. Next the plate stack 20 is fully immersed into the oil to allow the open port 22 for each display to accept oil into the cavities. As shown in FIG. 3C, to further drive the oil into the channel, the pressure in the chamber is increased. An example increase would be to raise the pressure to 650 torr. The oil does not displace the chilled ink, which provides a uniform filling. Lack of clamping pressure during the oil dosing step facilitates the oil filling the cavities between the spacers and the top plate. The gap can be sufficient to fill completely closed pixels cells. After filling, the stack 20 is removed from the oil supply 24.

Figure 4:
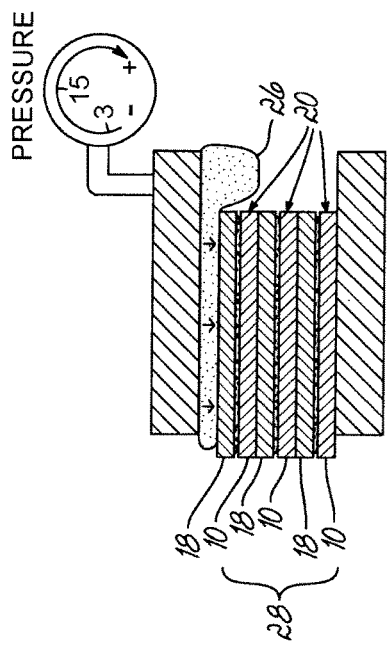
FIG. 4 depicts an exemplary pressurization process carried out on electrofluidic devices subsequent to filling of polar (ink) and nonpolar (oil) fluids.

Referring to FIG. 4, the plate stack 20, which is also a single module, is placed under pressure to push the top plate against the substrate. Suitable means of applying pressure include an air bladder device 26. Multiple modules (or plate stacks) may be positioned on top of one another forming a stack of modules 28, and collectively pressurized so that pressure is applied between the first module and last module of the stack of modules 28. The pressure, exemplary values ranging from 3 psig to 15 psig, sets the proper cell gap and can be used to adjust the tension in the stack of modules 28 after the final seal. With pressure applied, excess oil is cleaned from the fill port 22 and a second amount of adhesive is applied and cured to seal the fill port 22.

The choice of the ink/oil combination is very important. There are many competing design constraints. First, the ink and oil need to operate at or below −20° C. and survive −40° C. for typical applications, so they must both have freezing points below −40° C. and viscosities below 500 cp at −20° C. Next, for the assembly process described in example 1, the ink must have a freezing point significantly higher in temperature than the oil so that the viscosities of the two fluids differ by orders of magnitude at the oil fill temperature. The viscosity of the ink must remain low enough at the oil fill temperature so that it does not get displaced from the wells. In addition, the ink must be insoluble in the oil. This can be measured by placing a small (1 pL) drop of ink into a large (20 mL) volume of oil, and measuring the volume of the drop over time. If the drop decreases by less than 5% over 24 hours, the diffusion is small enough for the application. Also, the electrowetting performance must be suitable (must have a Young's angle ≥160° and electrowet down to ≤65°). Finally the interfacial tension between the polar and non-polar phases must be sufficiently high to prevent droplet ejection or splitting in the electrofluidic channel (>9 mN/m). Example polar fluids and mixtures include: ethylene glycol, propylene glycol, glycerol, gamma butyrolactone, and propylene carbonate. Example non-polar fluids include butyl cyclohexane, butyl cycloheptane, isopar M, isopar K, and isopar V.

In the case of an electrowetting display, the ink and oil phases are reversed from example 1, so the oil phase needs the lower freezing point. An additional embodiment of example 1 includes placing the second plate in a low pressure environment.

Devices that contain fluid need a perimeter seal to hold the fluids in the device. In the example of electrowetting and electrofluidic displays and devices, the device active area including features for holding ink that are coated with hydrophobic materials to prevent ink from sticking to the channel or cavity surface and provide for proper device operation. However, these materials also prevent formation of a good seal in the seal area and connection to the I/O lines. They generally must be removed from these areas prior to the first fluid filling. Consequently, the first fluid will preferentially stick to the seal perimeter area if it comes in contact with that area. To prevent having to clean the ink or first fluid off the non-active device area, during ink filling the ink is applied selectively to the active area surface only. An ink roller or meniscus coater can be used to apply the ink, and any excess ink remaining on the surface can be picked up with an additional roller, for example.

In the example of display devices, the economics of manufacturing typically dictate multiple displays are fabricated on a single substrate or first plate 10. Each display has its own perimeter, and each perimeter needs to remain clear of the ink in order to facilitate bonding of the plates (i.e., the top plate 18 to the substrate 10). A tool can be used to fill ink preferentially into the device active areas which contain multiple heads, therein applying ink preferentially to each device area. The top plate 18 can also contain multiple displays, wherein the step of bonding the top plate 18 to the bottom plate 10 creates an X-Y array of connected modules. Scribes are made on the first plate 10 and the second plate 18 to allow the individual displays to be separated from one another into individual modules. The displays are then processed as individual display modules for the remaining steps.

In example 1, the substrate 10 was placed into vacuum for ink filling. In the case where the surface features are predominantly wells or holes with an aspect ratio of 1:1 or higher, and the surface is very hydrophobic, so simply drawing a meniscus across the surface as described by Jackman et al. (Anal. Chem 1998, 70, 2280-2287) will not fill the holes. Instead, a meniscus skin will remain above the well features. Eventually, the meniscus skin will break, thereby leaving just a trace of ink in the well.

In order to get the ink into the well with an aspect ratio of 1:1 or higher, the foregoing process applies positive pressure to the ink to push the ink into the well. One method of providing this positive pressure is to cover the surface with ink under vacuum (1 to 10 torr) and then increase the pressure (50 torr to atmospheric pressure for example) before moving the meniscus off the surface, as was done in example 1. This pressure change forces the ink into the wells allowing the ink to cleave off when the meniscus slides over the wells. But positive pressure can also be applied in the form of a roller or air jet. The ink cleavage may be enhanced with pulsation, changes in the distance of the meniscus and the surface, and electrical force, as non-limiting examples.

Figure 5B:
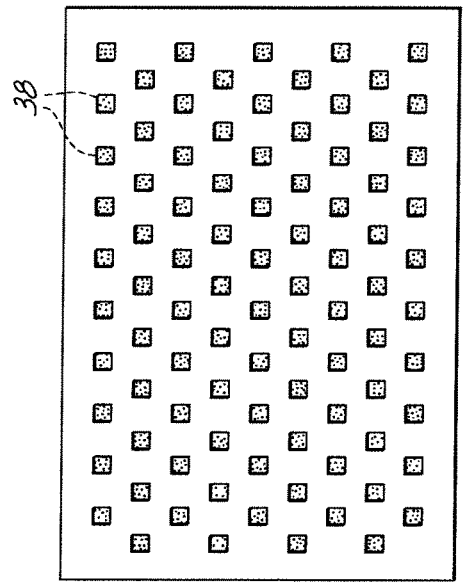
FIGS. 5A-5B depict an exemplary ink application process carried out on electrofluidic devices.
Figure 5A:
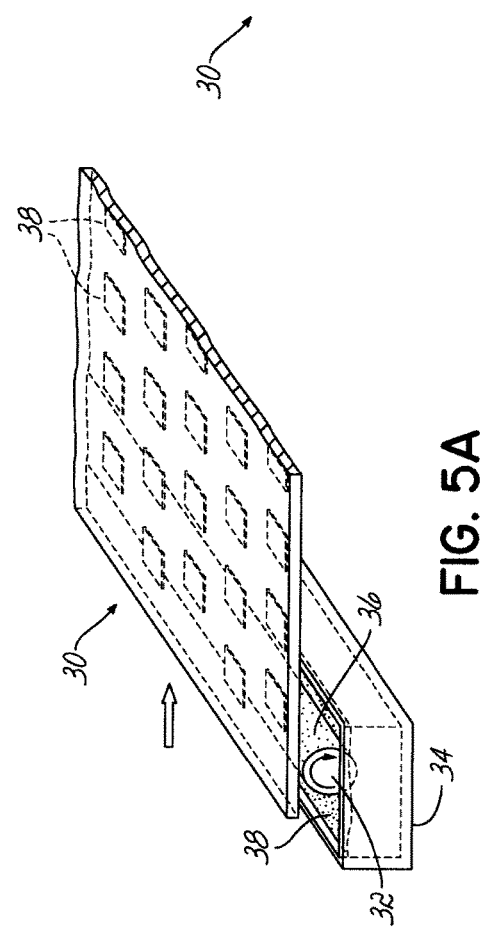

In contrast to example 1, example 2 provides an alternative method of ink filling of wells when the wells have an aspect ratio nominally less than 1:1, while eliminating air bubbles. As an initial step, the ink is outgassed prior to being loaded into a dispensing device. Referring to FIG. 5A, the ink is dosed into cavities in a substrate 30 under ambient pressure (i.e. in air or $N_2$) using rollers soaked in ink. In this example, there are 90 displays on a large sheet of glass in a 9×10 array. A set of 10 rollers positioned precisely over the active areas of each device selectively coat ink on the active areas (one roller 32 is shown). The speed of the first plate 30 and the rollers is important for cleaving the ink and providing 100% fill of all the features in each active area. Many factors affect the optimal speed but an exemplary nonlimiting range is 5 mm per second to 25 mm per second. The first substrate 30 is positioned with the surface features to be filled facing down to allow contact by the ink-filled soft, spongy roller 32. The bottom ends of the roller 32 are in contact with a bath of ink 34, providing a fresh ink supply 36. Ink is applied to the surface of the substrate, with excess ink being removed from the surface thereafter. The ink removal cleaves the ink on the surface, but retains the ink within the cavities 38 (i.e., wells). It should be noted that the ink evaporates over time in ambient conditions and this may result in the cavities becoming insufficiently filled with ink before a subsequent step. To address this potential issue, the substrate having the wells filled with ink is chilled subsequent to ink filling and prior to subsequent steps. FIG. 5B shows a series of wells 38 filled with ink using the roller method.

As shown in FIGS. 6A-6C, an adhesive 40 (e.g., a UV-curable adhesive) is applied to a top plate 42 (or topstrate), in an exemplary 90 repeated patterns in a matrix, and is then aligned and contacts the substrate 44. Pressure is applied to the topstrate-substrate ensemble 46 while the adhesive is UV-cured. A cavity exists between the plates, formed typically by spacer structures fabricated on a plate. The top plate-substrate ensemble plate stack 46, containing the 90 displays is scribed on both sides and broken into 90 separate display modules 48. These display modules 48 are then positioned face to face to form an exemplary stack of 90 display modules. The cavities of each display module will be filled with a second fluid (oil) in the next step. The adhesive pattern leaves at least one open port for the later filling of the second fluid.

Referring to FIGS. 7A-7C, a stack of modules 50 is placed into a vacuum chamber 12 and air is at least partly pumped out of the channel. The stack of modules is then dunked into a volume of oil 52 at or near the freezing point of the ink (first fluid) with the open port 54 at the top. The ink in the modules is frozen (or becomes extremely viscous prior to the oil fill). The pressure is reduced below 10 torr, and preferably below 1 torr to fully evacuate the channel. The stack of modules is then immersed to allow oil to occupy the (air-free) cavities. An increase in chamber pressure to near atmospheric pressure of an inert gas drives the oil into the channel. The oil does not displace the chilled ink, thereby providing a uniform filling. The stack of modules 50 is thereafter removed from the fill chamber and placed under clamping pressure to squeeze the plates together. Excess oil is cleaned from the fill port and a second amount of adhesive seals the fill port.

Figures 8A, 8B, 8C:
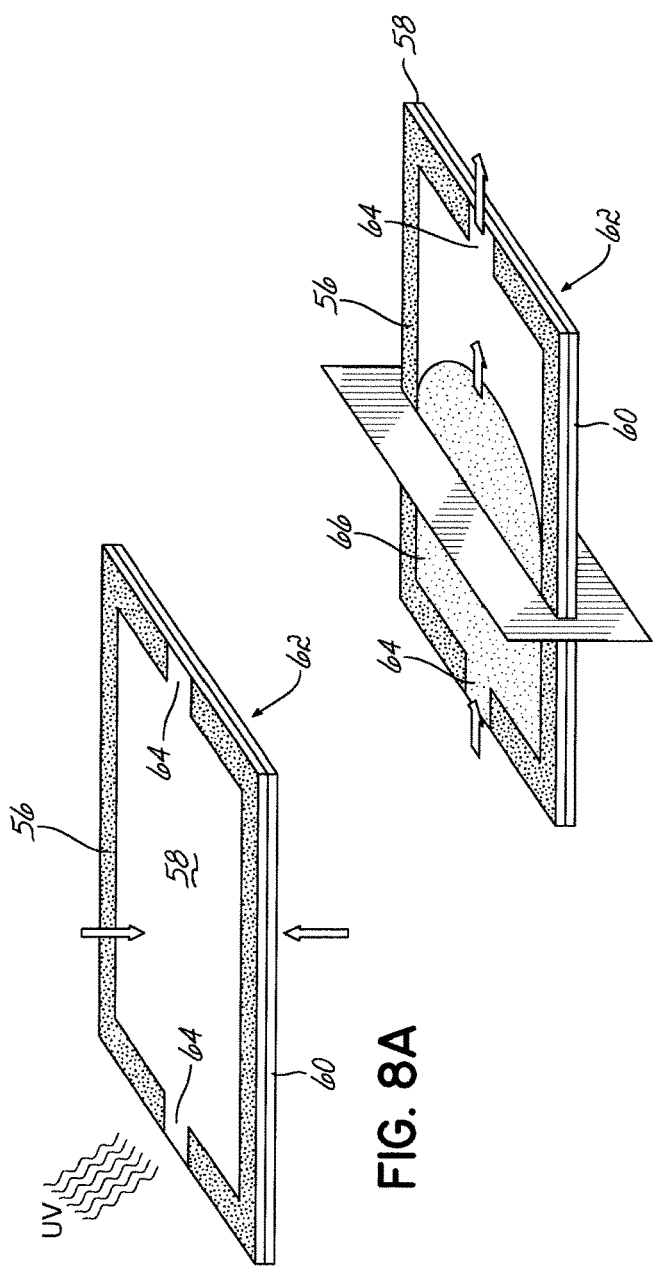
FIGS. 8A-8C depict an exemplary sequence in accordance with the instant disclosure.

Referring to FIGS. 8A-8C, a third example also includes a process for dosing two fluids while eliminating air bubbles. As an initial matter, an adhesive 56 (e.g., a UV-curable adhesive) is applied to a top plate 58, which is then aligned and contacted to a substrate or first plate 60. Pressure is applied to the plates while the adhesive 56 is UV-cured to create a plate stack, which, in FIG. 8A is also a single module 62. A plurality of cavities exist between the plates in the stack, formed typically by spacer structures interposing the plates. The foregoing adhesive step results in at least two fill ports 64 in the seal perimeter, generally on opposing sides of each device. Thereafter, a first fluid 66 (e.g., an ink) completely fills the cavities. Suitable methods to fill the cavities with ink include placing ink at one fill port and reducing the pressure at the other to draw the ink into the cavities. In the next step, the second fluid 68 (e.g., an oil) is flushed into the cavities, shearing the ink off at the edges of the surface features in the first plate. The oil will wick through the device via capillary wetting and will generally remove all ink unless the ink has high viscosity compared to the oil. The resulting device is then placed under clamping pressure (nominally 3 to 15 psig) to squeeze the module plates together. The pressure sets the proper cell gap by forcing the plates onto the spacer, and pressure can be used to adjust the tension in the plate stack (module) after the final seal. With pressure applied, excess ink is cleaned from the fill port and a second amount of adhesive seals the fill port.

Referring to FIGS. 9A-9C, an electrofluidic device 70 is fabricated by dosing a series of ink droplets 72 with precisely measured volumes onto a first layer 74, where the ink droplets each have similar volume. An adhesive (e.g., a W-curable adhesive) is applied to a top plate 76, and the middle layer 78 is assembled to the top plate 76 by means of fixture, adhesive, or the like, which is then aligned and contacted with the first plate 74 so that the first plate 74 and top plate 76 sandwich the middle layer 78 therebetween. Pressure is applied to the stack 80 while the adhesive is W-cured to form a module 70. A cavity exists between the plates of the module, formed typically by spacer structures fabricated on a plate. The cavity will be filled with a second fluid (oil) in the next step. The adhesive pattern leaves at least one open port for the later filling of the second fluid. The module is placed into a vacuum chamber 12 and at least some air is pumped out of the channel. The module 70 is then immersed in oil at or near the freezing point of the ink (first fluid) with the open port 82 at the top to above the oil level. When the ink is cool, additional air is pumped out of the channel in suing a chamber pressure of less than 10 torr, and more preferably less than 1 torr. The module is then fully submersed in oil, and the chamber pressure increased to drive the oil into the channel. The oil does not displace the chilled ink, providing a uniform filling. The module is removed from the oil fill chamber and placed under clamping pressure to squeeze the plates 70 together. Excess oil is cleaned from the fill port 82 and a second amount of adhesive seals the fill port.

In an alternative process to example 4, a series of multiple displays on the first plate can be filled with ink using a droplet approach. After assembly with a second plate, which includes top plates with areas for multiple displays, the stack plate assembly is scribed on both sides and broken into individual display modules. The individual display modules are dosed with oil as in example 4.

Figure 10A:
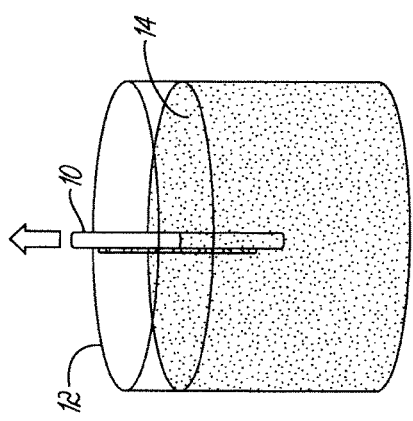
FIGS. 10A-10C depict an exemplary sequence in accordance with the instant disclosure.
Figure 10B:
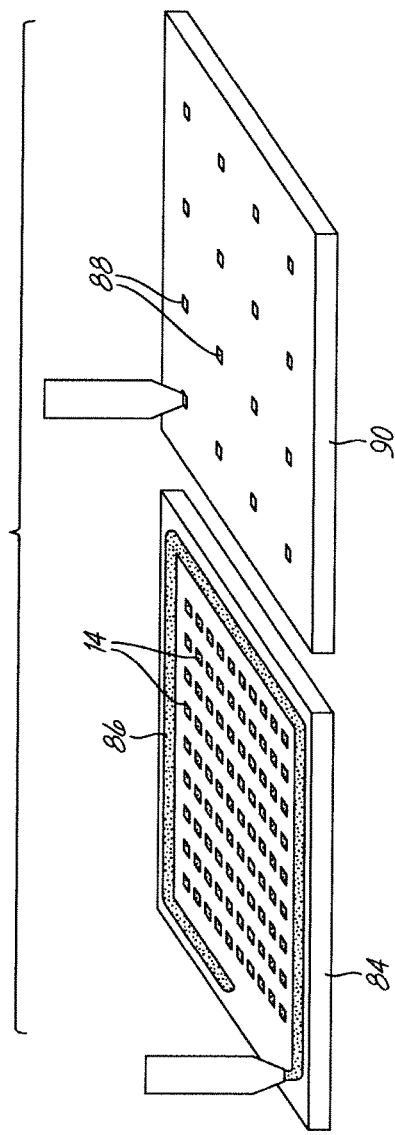
Figure 10C:
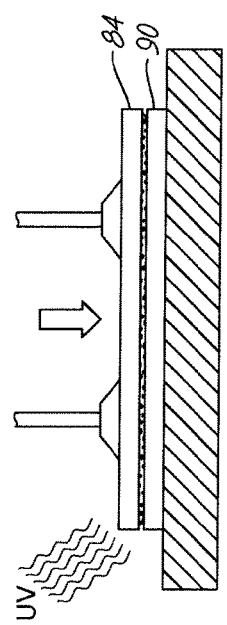

Referencing FIGS. 10A-10C, a fifth exemplary process for dosing fluid into an electrofluidic device utilizes a measured-drop oil fill sequence. Initially, ink 14 is dosed into cavities in a substrate 84 by placing the substrate 84 in a vacuum chamber 12, pulling a vacuum to remove air from the cavities, ink 14 is applied to the surface as shown in FIG. 10A, and the ink is then removed from the surface. The removal cleaves the ink on the surface and it remains in a cavity. In this example, the removal of the ink from the substrate 84 is performed at atmospheric pressure. The ink is chilled to freeze it into the first surface structures. Thereafter, an adhesive 86 (e.g., a UVcurable adhesive) is applied to the first plate 84. Measured droplet volumes of the second fluid 88 (i.e. oil) are then applied to the second plate 90. The droplets 88 on the second plate 90 have a low surface energy and spread uniformly across the surface. The second plate 90 is cooled to increase the viscosity of the second fluid 88. Subsequently, the first and second plates 84, 90 are then aligned and contacted to the substrate. Pressure is applied to the stack of the first and second plates 84, 90 while the adhesive 86 is UV-cured. The second fluid 88 in step 2 has been measured to fill the cavity between the plates. The high viscosities of the first and second fluid prevent the oil from popping the ink out of the wells as soon as contact is made. In a preferred embodiment, the oil volume is slightly larger than needed, and a port is left in the seal area to allow excess oil to squeeze out. The fill port is then cleaned while the plate stack is still under clamping pressure, and adhesive is applied to the port. The adhesive 86 is then cured to complete the final seal.

Figures 11A, 11B, 11C:
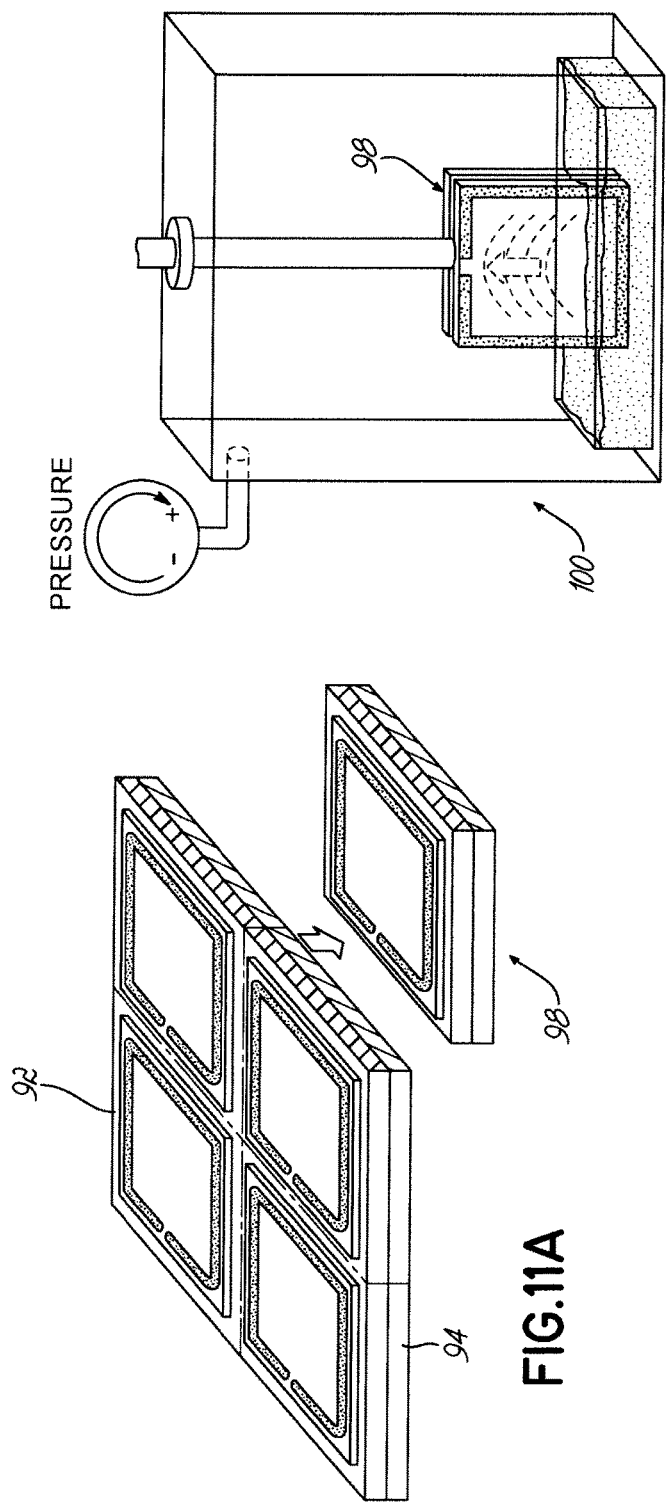
FIGS. 11A-11C depict an exemplary sequence in accordance with the instant disclosure.

Referring to FIGS. 11A-11C, a sixth exemplary process for dosing fluids to form an electrofluidic device includes using an emulsion. A first plate 92 and a second plate 94 are assembled together forming a plurality of cavities there between, with at least one fill port 96 per cavity. The plates are scribed on each side and broken apart to yield a plurality of individual modules 98, each with one cavity. The emulsion is introduced into the cavity with a vacuum fill process 100. The module 98 undergoes a final seal process where pressure is applied to the module 98 and the fill port is sealed off. The emulsion 102 is then collapsed with the application of ultraviolet light, and the polar fluid preferentially fills the well feature. In additional embodiments, the emulsion can be collapsed with other triggers: thermal, electrical, or other light wavelengths.

This has been a description the present invention, along with the preferred method of practicing the present invention, however, the invention itself should only be defined by the appended claims, wherein we claim:

What is claimed is:

1. A method for manufacturing an electrofluidic device, comprising:
    providing a first plate with features for a first fluid;
    providing a second plate;
    sealing the second plate onto the first plate thereby forming a stacked plate assembly with at least one cavity between the plates, and leaving at least one fill port for fluid filling;
    filling a mixture of ink and oil fluids between the plates; and,
    collapsing the mixture into the constituent fluids by applying light to the mixture.

2. The method of claim 1 wherein the light is ultraviolet light.

3. The method of claim 1 wherein the mixture is an emulsion of the ink and oil fluids.

4. The method of claim 1 wherein the ink fluid is a polar fluid.

5. The method of claim 4 wherein the ink fluid includes at least one of ethylene glycol, propylene glycol, glycerol, gamma butryolactone, and propylene carbonate.

6. The method of claim 1 wherein the oil fluid is a non-polar fluid.

7. The method of claim 6 wherein the oil fluid includes at least one of butyl cyclohexane, butyl cycloheptane, isopar M, isopar K, and isopar V.

* * * * *